Figure 1:
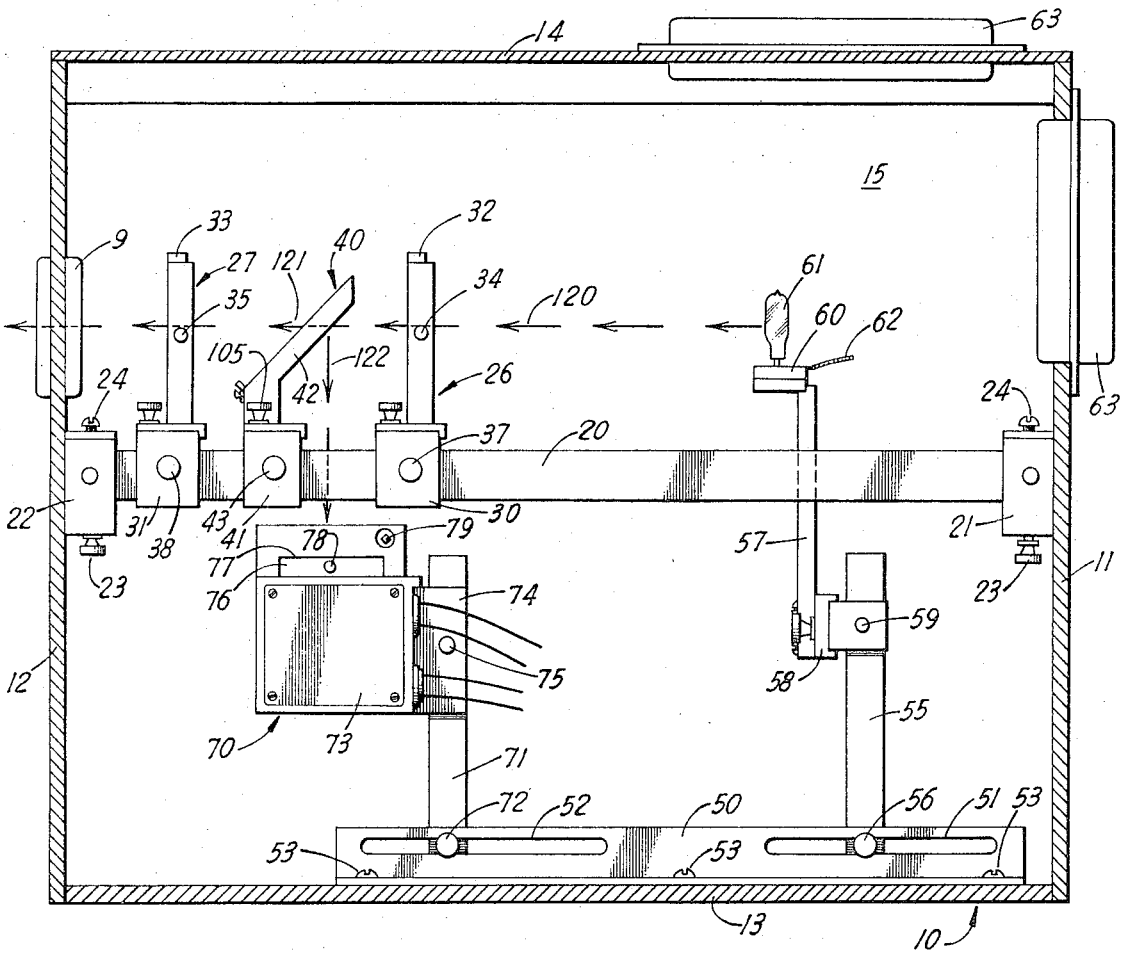
Figure 2:
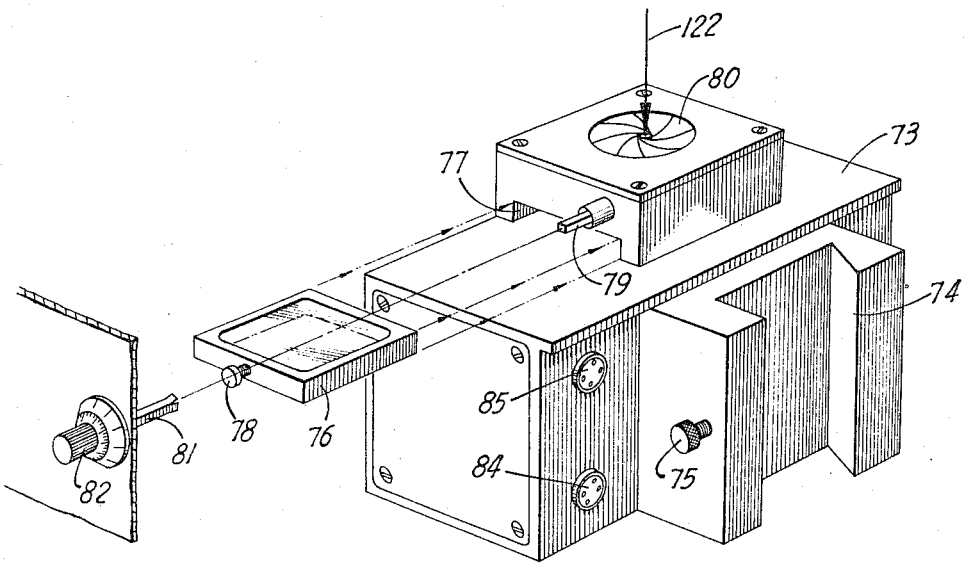
Figure 3:
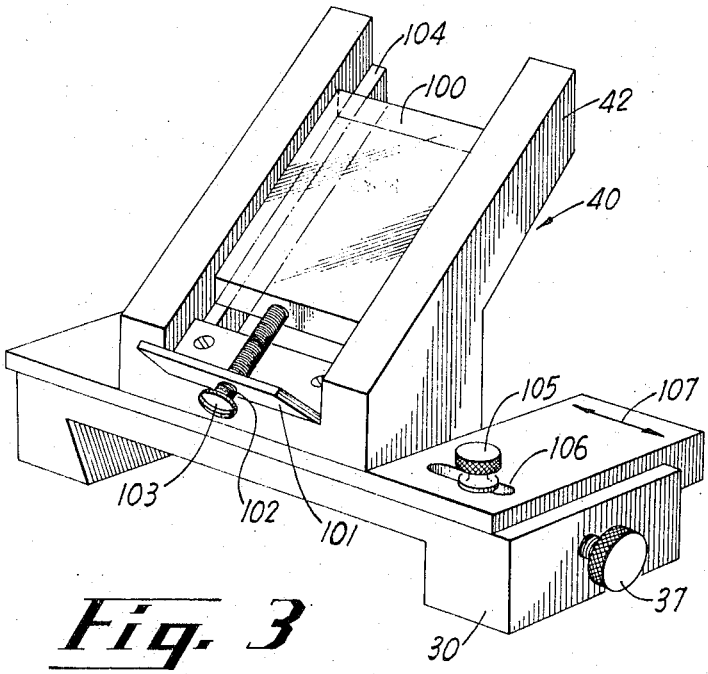
Figure 4:
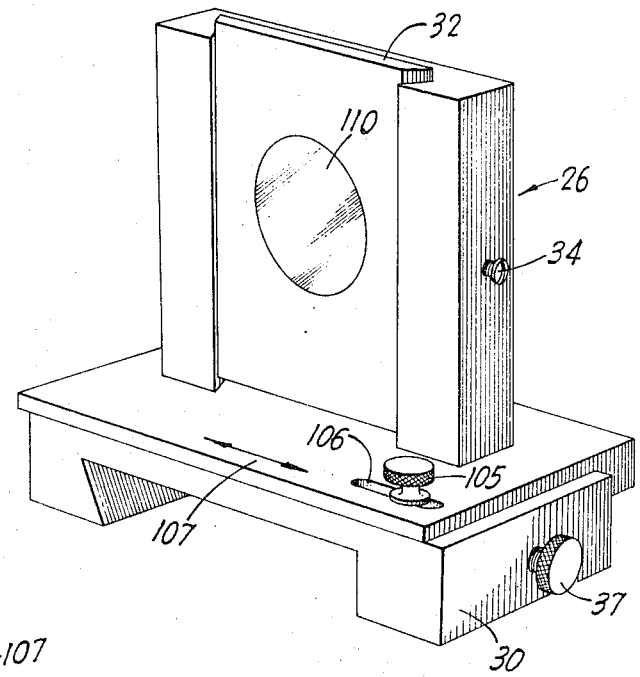
Figure 5:
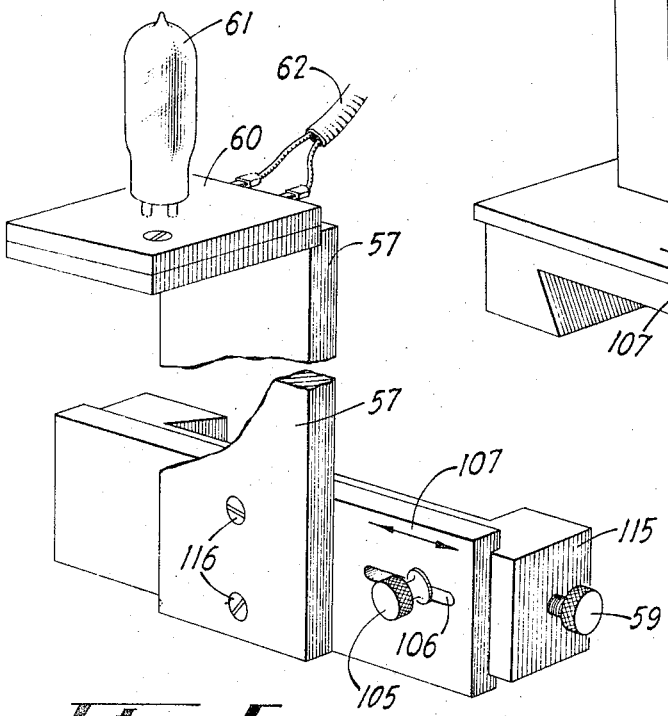

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 5, 1974

928 O.G. 7

T928,005

OPTICAL BENCH FOR A STABLE SOURCE OF RADIATION

Dale K. Cabbiness and George J. Hanggi, Ponca City, Okla., assignors to Continental Oil Company, Ponca City, Okla.

Filed Nov. 30, 1973, Ser. No. 420,745
**Int. Cl. G01m *11/00***
U.S. Cl. 356—256
2 Sheets Drawing. 6 Pages Specification

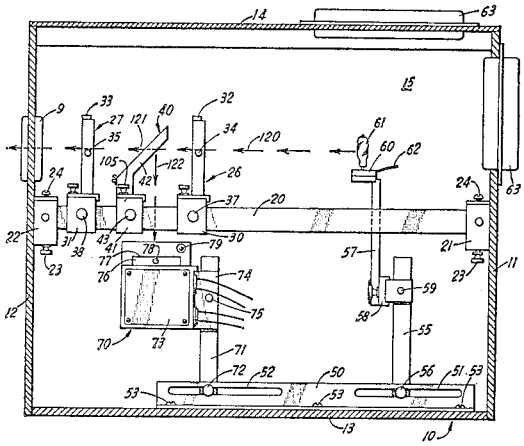

An optical bench for a stable source of radiation useful in spectrophotometry comprising a box formed of sides, a back, and a top and having a dovetail bar attached between the vertical sidewalls of the box. An opening is positioned in one of the sidewalls above the dovetail bar. A first and second lens mount is adjustably and slideably mounted on the dovetail bar. A beam splitting apparatus is likewise adjustably and slideably mounted on the dovetail bar between the first and second lens mounts. A light source is mounted on a separate mount but positioned in line with the first and second lens mounts, the beam splitter, and the opening in the box sidewall. Electronic circuitry sensitive to the light split off from the main beam is also adjustably mounted to the bottom of the box. The above unit forms a compact light source for spectrophotometry uses.

Nov. 5, 1974 D. K. CABBINESS T928,005

OPTICAL BENCH FOR A STABLE SOURCE OF RADIATION

Filed Nov. 30, 1973 2 Sheets-Sheet 1

OPTICAL BENCH FOR A STABLE SOURCE OF RADIATION

Filed Nov. 30, 1973 2 Sheets-Sheet 2